(12) United States Patent
Mendelsohn (10) Patent No.: US 11,215,843 B2
(45) Date of Patent: Jan. 4, 2022

(54) SPINNABLE FRAMES FOR SPECTACLES

(71) Applicant: JAND, INC., New York, NY (US)

(72) Inventor: Adam Mendelsohn, Centerport, NY (US)

(73) Assignee: Warby Parker Inc., New York, NY (US)

(*) Notice: Subject to any disclaimer, the term of this patent is extended or adjusted under 35 U.S.C. 154(b) by 153 days.

(21) Appl. No.: 16/547,025

(22) Filed: Aug. 21, 2019

(65) Prior Publication Data

US 2021/0055572 A1  Feb. 25, 2021

(51) Int. Cl.
 *G02C 5/20* (2006.01)

(52) U.S. Cl.
 CPC ..................................... *G02C 5/20* (2013.01)

(58) Field of Classification Search
 CPC ........ G02C 5/20; G02C 5/2263; G02C 5/146; G02C 5/143; G02C 2200/08; G02C 3/003; G02C 5/16; G02C 2200/18; G02C 5/10; G02C 5/22; G02C 11/00; G02C 11/02; G02C 2200/04; G02C 11/10; G02C 2200/16; G02C 2200/20; G02C 5/006; G02C 5/08; G02C 5/14; G02C 5/2209
 See application file for complete search history.

(56) References Cited

U.S. PATENT DOCUMENTS

| | | |
|---|---|---|
| 463,312 A | 11/1891 | Borsch |
| 2,083,287 A | 6/1937 | Birkenstein |
| 3,825,700 A * | 7/1974 | Jerry ..................... G02C 11/06 381/327 |
| 6,193,368 B1 * | 2/2001 | George .................... G02C 5/00 351/111 |
| 6,412,943 B2 | 7/2002 | Kim |
| 7,222,957 B1 | 5/2007 | Allred |
| 7,524,056 B2 * | 4/2009 | Bovee .................... G02C 3/006 351/119 |
| 9,759,929 B2 | 9/2017 | Rinehart |
| 2004/0130674 A1 | 7/2004 | Epstein |

(Continued)

FOREIGN PATENT DOCUMENTS

WO   WO 2018/129468 A1   7/2018

OTHER PUBLICATIONS

Oct. 15, 2020 PCT Notification of Transmittal of the International Search Report and Written Opinion of the International Searching Authority, or The Declaration concerning PCT/US20/42771.

*Primary Examiner* — William R Alexander
*Assistant Examiner* — Sharrief I Broome
(74) *Attorney, Agent, or Firm* — Duane Morris LLP (57) ABSTRACT

Spinnable frames for spectacles are provided. A spinnable frame allows a user to hold a distal end of one of the temples and freely spin the remainder of the spectacles around that end of the temple. A spin joint is provided in at least one of the temples that allows this spinning action. The spin joint may span an interface between the distal end of the temple and a proximal end of the temple, the proximal end being coupled to a front portion of the frame at a hinge interface. In this way, the temple arm is allowed to fold against the front portion for compact storage, as with conventional eyeglass frames, while facilitating spinning of the spectacles in a way that avoids excess forces on the hinge interface and/or other portions of the frame or lenses mounted therein.

24 Claims, 10 Drawing Sheets

(56) References Cited

U.S. PATENT DOCUMENTS

| | | | |
|---|---|---|---|
| 2007/0279583 A1* | 12/2007 | Bovee | G02C 3/006 |
| | | | 351/153 |
| 2015/0049292 A1* | 2/2015 | Wilson | G02C 11/10 |
| | | | 351/51 |
| 2016/0054585 A1 | 2/2016 | Alcini | |
| 2018/0129069 A1* | 5/2018 | Perdichizzi | G02C 5/143 |
| 2018/0361636 A1* | 12/2018 | Kuhnlein | B29D 12/02 |
| 2019/0243159 A1* | 8/2019 | Gardill | G02C 11/00 |
| 2020/0064652 A1* | 2/2020 | Asemani | G02C 5/02 |

\* cited by examiner

SPINNABLE FRAMES FOR SPECTACLES

BACKGROUND

Field

The present disclosure generally relates to eyewear, and more particularly to spinnable frames for spectacles.

Description of the Related Art

Eyeglass frames have long been designed hold a pair of corrective, filtering, or polarizing lenses in front of a wearer's eyes. The frame commonly includes a front portion that holds the lenses, and a symmetric pair of temple arms that extend from the front portion to rest between the wearer's head and ear. The temple arms are typically attached to the front portion by a hinge that allows the temple arms to pivot relative to the front portion, and thus to be folded against the front portion for compact storage of the eyeglasses.

However, it may be desirable to provide eyeglass frames with additional functionality.

SUMMARY

The present disclosure provides spinnable frames for eyeglasses. A spinnable frame includes a spin joint in at least one of the temples thereof that allows the user to hold an end of that temple and spin the remainder of the eyeglasses, including the remainder of the frame and any lenses mounted therein, around that end of that temple.

According to some aspects of the present disclosure, a frame for spectacles is disclosed, the frame including a front portion having two symmetric openings, each configured to hold a lens, a first temple arm having a proximal end that is coupled to a first end of the front portion by a first hinge, and having a distal end comprising a first temple tip, a second temple arm. The second temple arm includes a first portion that extends between a proximal end that is coupled to an opposing second end of the front portion by a second hinge, and a distal end. The second temple arm also includes a second portion that extends between a proximal end that is coupled to the distal end of the first portion, and a distal end comprising a second temple tip. The second portion of the second temple arm is freely rotatable, relative to the first portion of the second temple arm, about a spin axis that is substantially parallel to a length of the second temple arm at an interface between the distal end of the first portion and the proximal end of the second portion.

According to some aspects of the present disclosure, a pair of spectacles is disclosed, including first and second lenses, and a frame. The frame includes a front portion having a first opening in which the first lens is disposed and a second opening in which the second lens is disposed. The frame also includes a first temple arm having a proximal end that is coupled to a first end of the front portion by a first hinge, and having a distal end comprising a first temple tip. The frame also includes a second temple arm. The second temple arm includes a first portion that extends between a proximal end that is coupled to an opposing second end of the front portion by a second hinge, and a distal end. The second temple arm also includes a second portion that extends between a proximal end that is coupled to the distal end of the first portion, and a distal end comprising a second temple tip. The second portion of the second temple arm is freely rotatable, relative to the first portion of the second temple arm, about a spin axis that is substantially parallel to a length of the second temple arm at an interface between the distal end of the first portion and the proximal end of the second portion.

According to some aspects of the present disclosure, a frame for spectacles is provided, the frame including a front portion configured to house lenses for the spectacles, and a pair of temple arms, each coupled to a respective end of the front portion and pivotable relative to the front portion about a respective hinge access. At least one of the temple arms includes a spin joint that allows a distal portion of that temple arm to rotate freely, relative to a proximal portion of that temple arm, the front portion, and the other of the temple arms.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

It has been discovered that it is a common habit, among eyeglass wearers, to occasionally remove their eyeglasses from their face, and spin the eyeglasses around one of the temple arms, while holding that temple arm in their fingers. This spinning action can be performed as a conscious act, or an unconscious movement while the "spinner" is mentally occupied with other tasks. However, spinning conventional eyeglasses in this way can cause stress on the eyeglass frame structures and/or interfaces, and/or on lenses mounted in the frames, for which those structures were not designed.

The present disclosure provides an improvement to conventional spectacle frames by providing a spinnable frame with features designed and constructed to facilitate smooth and easy spinning of the frame (e.g., without generating undesired stresses on the frame or lenses).

Example Spinnable Frame

Figure 1:
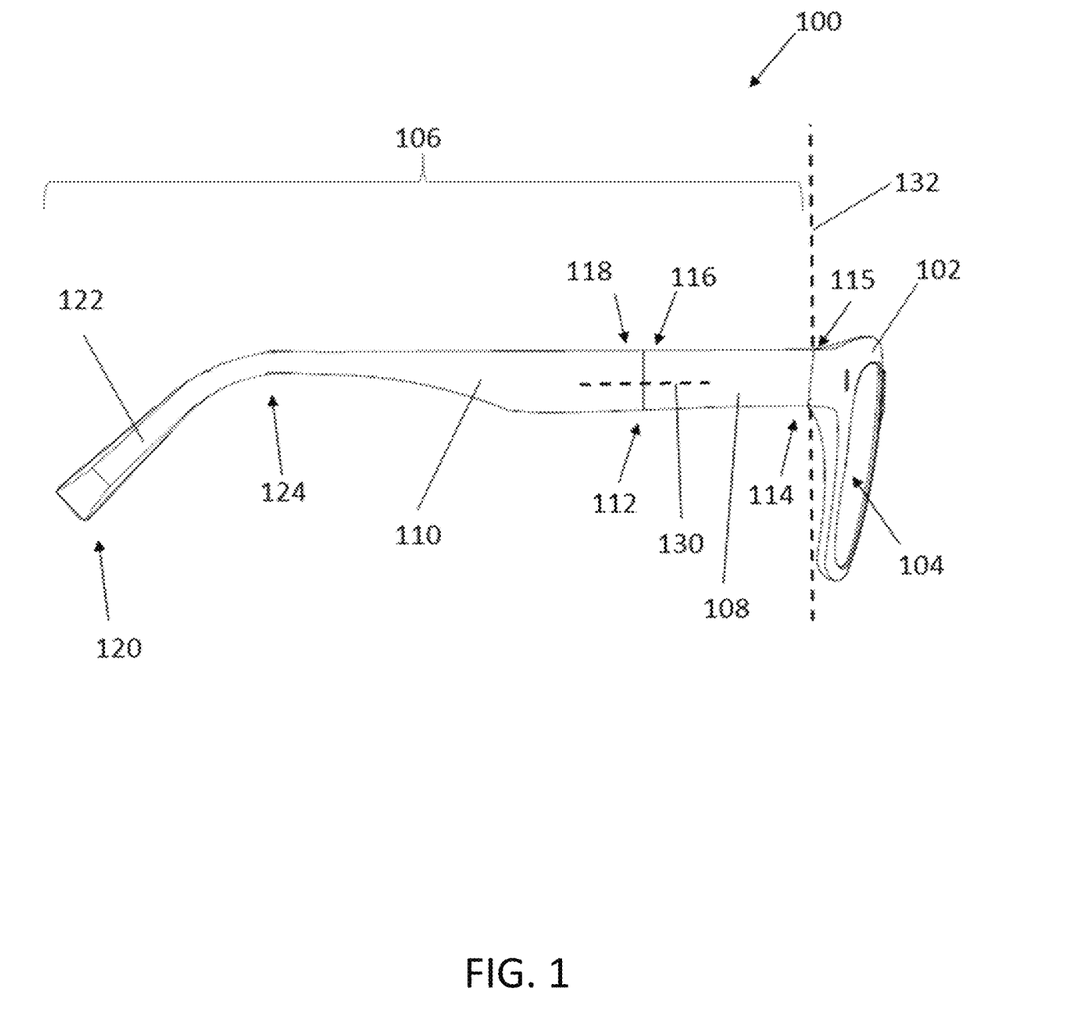
FIG. 1 illustrates a side view of a spinnable frame for spectacles, according to various aspects of the disclosure.

FIG. 1 illustrates a side view of a spinnable frame 100 for eyeglasses such as eyeglasses with corrective, filtering, and/or polarizing lenses. The side view of frame 100 shows a temple arm 106 that is coupled at a hinge interface 115 to a front portion 102 of the frame 100, and that includes a spin interface 112, which will be described in further detail herein.

As shown, frame 100 includes one or more (typically two) openings 104 in the front portion 102, each opening 104 configured to hold a lens such as a corrective lens, a filtering lens, and/or a polarizing lens for correcting the user's vision and/or for reducing brightness and/or reflections. As with conventional eyeglass frames, frame 100 includes hinge interface 115 between temple arm 106 and front portion 102, hinge interface 115 configured to allow temple arm 106 to pivot about a hinge axis 132 of the hinge interface (e.g., to allow the temple arms to be folded toward front portion 102, such as for compact storage when the frame is not being worn on a user's face). Hinge interface 115 can include a springless hinge or a springed hinge in which portions of the frame angularly slide relative to one another to allow movement of temple arm 106 relative to front portion 102, or hinge interface 115 can be implemented using materials that bend to allow movement of temple arm 106 without sliding of portions of the frame/hinge against each other.

In the side view of FIG. 1, it can be seen that temple arm 106 includes a first portion 108 and a second portion 110. First portion 108 extends between a proximal end 114 that is coupled front portion 102 at hinge interface 115, and a distal end 116. Second portion 110 extends between a proximal end 118 that is coupled to the distal end 116 of the first portion, and a distal end 120 at a temple tip 122. In this example, temple arm 106 is a curved temple arm with a bend 124 that allows the temple arm to extend over and around a wearer's ear. However, it should be appreciated that straight temple arms can also be provided with spin interfaces as described herein.

Second portion 110 of temple arm 106 is freely rotatable, relative to first portion 108 of temple arm 106, about a spin axis 130. As shown in the example of FIG. 1, spin axis 130 is substantially parallel to a length of temple arm 106 at interface 112 between the distal end 116 of the first portion 108 and the proximal end 118 of the second portion 110. In this example, spin axis 130 is substantially perpendicular to hinge axis 132 of the second hinge at any pivot position of temple arm 106 about hinge axis 132.

Figure 2:
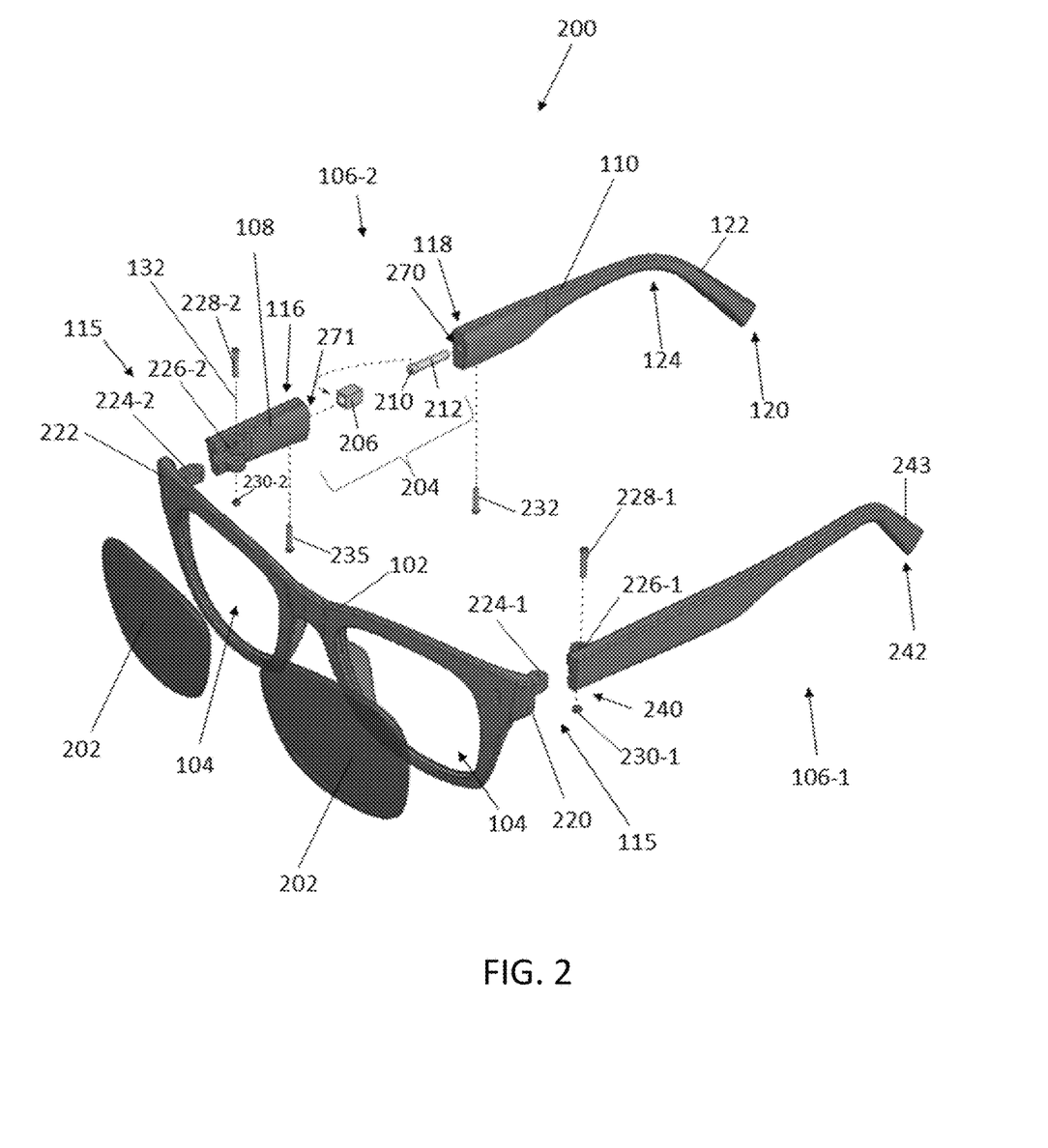
FIG. 2 illustrates an exploded to perspective view of a pair of spectacles having a spinnable frame, according to various aspects of the disclosure.

FIG. 2 illustrates an exploded perspective view of spectacles 200, implemented with spinnable frame 100 of FIG. 1, according to various aspects of the disclosure. In this example, frame 100 includes a first temple arm 106-1 that extends from a first end 220 of front portion 102, and temple arm 106 of FIG. 1 is implemented as a second temple arm 106-2 that extends from an opposing second end 222 of front portion 102.

In the example of FIG. 2, first temple arm 106-1 is a monolithic temple arm that extends continuously from the first hinge to a corresponding (e.g., first) temple tip 243. In this example, first temple arm 106-1 is pivotable about a corresponding (e.g., first) hinge axis at a corresponding (e.g., first) hinge interface 115 at first end 220 of front portion 102, but is not otherwise rotatable relative to front portion 102 or second temple arm 106-2.

In this example, first portion 108 of temple arm 106-2 (e.g., a proximal portion of temple arm 106-2) is pivotable about the hinge axis 132, and fixed with respect to the spin axis 130 (see, e.g., FIG. 1), and a spin joint 204 is provided that allows second portion 110 (e.g., a distal portion of temple arm 106-2) to freely rotate (e.g., through any number of rotational degrees including more than 360 degrees without any stop mechanism that would prevent further rotation or rotation in an opposite direction).

Spin joint 204 can be implemented using any suitable interface that allows distal portion 110 to freely rotate about spin axis 130, relative to proximal portion 108, while preventing distal portion 110 from pulling away from proximal portion 108 along the spin axis or rotating about any other axis at interface 112. In the example of FIG. 2, spin joint 204 is implemented as a ball and socket joint that spans the interface between the distal end 116 of the first portion 108 and the proximal end 118 of the second portion 110.

In this example, a ball portion 210 is coupled to a shaft 212. A socket portion 206 is configured to be mounted (e.g., by a mounting member 235 (e.g., a screw or a pin) in first portion 108 and to receive ball portion 210 such that shaft 212 extends from the socket portion in first portion 108 of temple arm 106-2, across interface 112, and into second portion 110. An additional mounting member 232 (e.g., a screw or a pin) extends into second portion 110 to secure a distal end of shaft 212 therein. In this way, socket portion 206 and shaft 212 are securely mounted, respectively, in first and second portions 108 and 110 in a manner that prevents movement or rotation of socket portion 206 and shaft 212 relative to the temple arm structures in which they are embedded. Ball portion 210, rotating within a cavity in socket portion 206, then allows the free rotation of second portion 110 relative to first portion 108, without allowing second portion 110 to move away from first portion 108 along the spin axis.

The components of spin joint 204 may be formed from similar or different materials to the material of proximal portion 108 and distal portion 110 of temple arm 106. For example proximal portion 108 and distal portion 110 can be formed from a polymer material (e.g., polyoxymethylene (POM)), a metal, or a combination of materials. The components of spin joint 204 (e.g., socket portion 206, ball portion 210, and shaft 212) can be formed from relatively harder material that can withstand the forces generated by many (e.g., thousands or tens of thousands) of rotations, such as a metal (e.g., a stainless steel such as SUS 316F). Front portion 102 and temple arm 106-2 may be formed from the same material (e.g., a polymer such as POM) as proximal portion 108 and distal portion 110 of temple arm 106-2.

As illustrated in FIG. 2, proximal portion 108 has an interface surface 271 that opposes an interface surface 270 of distal portion 110. In various implementations, the interfacing surfaces 271 and 270 of first and second portions 108 and 110, and/or the interfacing surfaces between ball portion 210 and socket portion 206, can be low friction interfaces that allow second portion 110 to continue spinning, relative to first portion 108, after removal of an external spinning force and/or under the force of gravity, or can be frictional interfaces that slow, stop, and/or hold second portion 110 at any rotational position, relative to first portion 108, at which an external spinning force is removed. For example, second portion 110 can be spun away from the orientation illustrated in FIGS. 1 and 2 in which interfacing surfaces 270 and 271 exactly align, through any number of degrees of rotation, and can remain at any rotational orientation about spin axis 130 in the absence of external forces.

For example, in some implementations, second portion 110 of second temple arm 106-2 is configured, in the absence of external forces, to remain at rest at any angular position, relative to proximal portion 108, about the spin axis 130. For example, interface 112 may be a frictional interface that causes second portion 110 of second temple arm 106-2, in the absence of external forces, to remain at rest at any angular position, relative to proximal portion 108, about spin axis 130. This frictional interface may be provided by a frictional interaction between surfaces 270 and 271, and/or by a frictional interaction with ball portion 210 and socket portion 206. Additionally, surfaces 270 and 271 may be mounted in close proximity so that these surfaces interact, at all rotational positions of second portion 110, relative to proximal portion 108, to prevent rotation of second portion 110, relative to first portion 108, about any axis other than spin axis 130 (see, e.g., FIG. 1).

FIG. 2 illustrates an example in which hinge interfaces 115 at the respective first and second ends 220 and 222 of front portion 102 are formed by respective first and second hinges. In this example, the first hinge at first end 220 is a barrel hinge formed by a male part 224-1 on front portion 102, a female part 226-1 on temple arm 106-1, a bolt 228-1, and a nut 230-1. In an assembled configuration, bolt 228-1 passes through openings in the male and female parts 224-1 and 226-1, and nut 230-1 attaches to bolt 228-1 to hold male part 224-1 within and aligned with female part 226-1, so that temple arm 106-1 can pivot about a first hinge axis defined by the shaft of bolt 228-1, without rotating relative to front portion 102 of frame 100.

In this example, the second hinge at second end 222 is a barrel hinge formed by a male part 224-2 on front portion 102, a female part 226-2 on temple arm 106-2, a bolt 228-2, and a nut 230-2. In the assembled configuration, bolt 228-2 passes through openings in the male and female parts 224-2 and 226-2, and nut 230-2 attaches to bolt 228-2 to hold male part 224-2 within and aligned with female part 226-2, so that proximal portion 108 of temple arm 106-2 can pivot about a second hinge axis 132 defined by the shaft of bolt 228-2, without rotating relative to front portion 102 of frame 100. It should also be appreciated that hinge interfaces 115 can be implemented with different hinge structures (e.g., barrel hinges having more than three barrels, springed hinges, or materials-based flexor interfaces).

Figure 3:
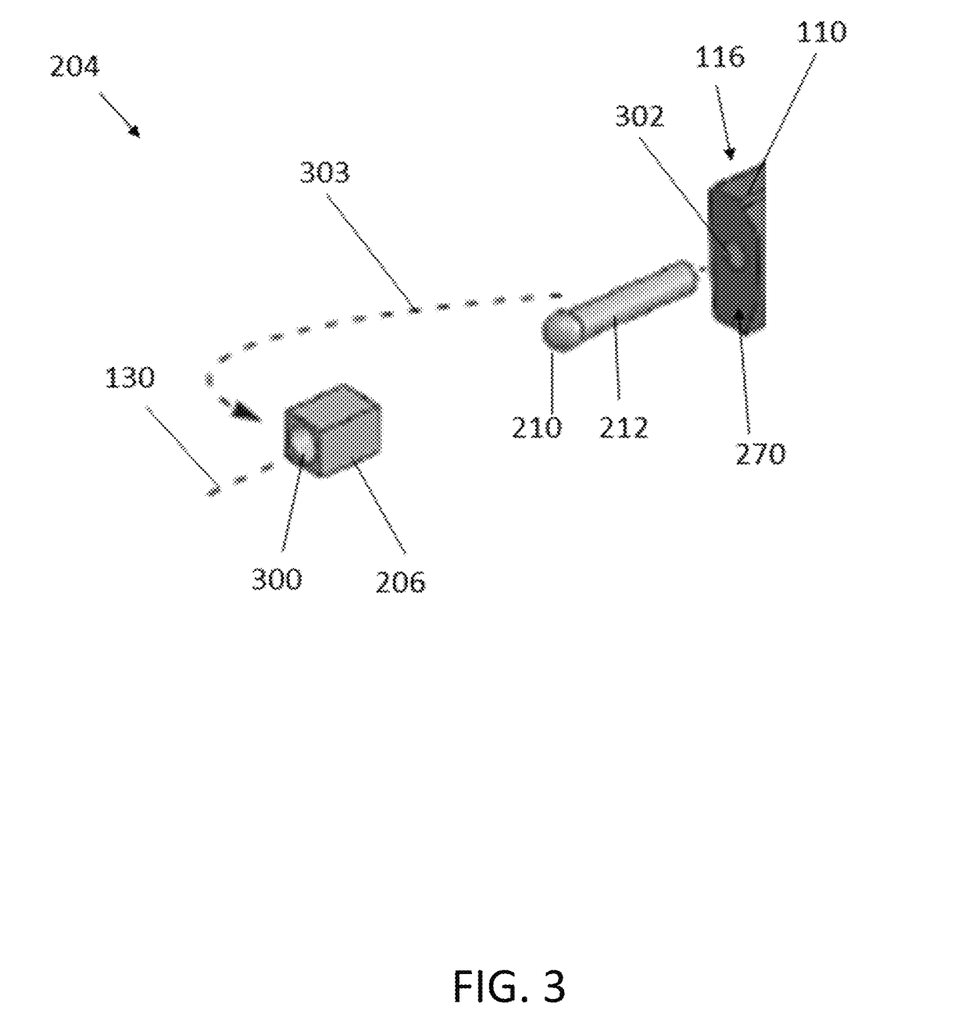
FIG. 3 illustrates an exploded perspective view of an example spin joint for a spinnable frame for spectacles, according to various aspects of the disclosure.

FIG. 3 shows an enlarged view of the components of spin joint 204 of FIG. 2. As can be seen in the enlarged view of FIG. 3, distal portion 110 of temple arm 106-2 can be provided with an opening 302 in surface 270. Opening 302 is configured to receive shaft 212 during assembly of frame 100. For example, prior to securing socket portion 206 in proximal portion 108 of temple arm 106-2 (e.g., using a pin/screw 235 extending into proximal portion 108 from a bottom surface to socket portion 206), shaft 212 may be inserted, as indicated by arrow 303, through socket portion 206 such that ball portion 210 engages with a correspondingly shaped cavity 300 in socket portion. The portion of shaft 212 that extends from the distal side of socket portion 206 may then be inserted into opening 302, and secured within distal portion 110 of temple arm 106-2 (e.g., using a pin/screw 232 extending into distal portion 110 from a bottom surface to shaft 212).

In an assembled configuration, spectacles 200 of FIG. 2 may include first and second lenses 202, and a frame 100. The assembled frame includes a front portion 102 having a first opening 104 in which the first lens 202 is disposed and a second opening 104 in which the second lens 202 is disposed. The assembled frame also includes a first temple arm 106-1 having a proximal end 240 that is coupled to a first end 220 of the front portion 102 by a first hinge 499 (see, e.g., FIG. 5), and having a distal end 242 at a first temple tip 243. The assembled frame also includes a second temple arm 106-2 that includes a first portion 108 that extends between a proximal end 114 that is coupled to an opposing second end 222 of the front portion by a second hinge 500 (see, e.g., FIG. 5), and a distal end 116. The second temple arm 106-2 also includes a second portion 110 that extends between a proximal end 118 that is coupled to the distal end 116 of the first portion 108, and a distal end 120 at a second temple tip 122. In the assembled configuration, second portion 110 of the second temple arm 106-2 is freely rotatable, relative to the first portion 108 of the second temple arm, about a spin axis 130 that is substantially parallel to a length of the second temple arm 106-2 at an interface 112 between the distal end 116 of the first portion 108 and the proximal end 118 of the second portion 110. In the assembled configuration, the second portion 110 of the second temple arm 106-2 is freely rotatable, relative to the first portion 108 of the second temple arm 106-2, about the spin axis 130 in a first angular direction, and freely rotatable, relative to the first portion 108 of the second temple arm 106-2, about the spin axis 130 in a second angular direction that is opposite to the first angular direction. In the assembled configuration, the second portion 110 of the second temple arm 106-2 is freely rotatable, relative to the first portion 108 of the second temple arm 106-2, about the spin axis 130 for more than three hundred sixty degrees in the first angular direction and the second angular direction.

In some implementations, the second portion 110 of the second temple arm 106-2 is configured, in the absence of external forces, to remain at rest at any angular position, relative to the proximal portion 108, about the spin axis 130. In some implementations, the interface 112 is a frictional interface that causes the second portion 110 of the second temple arm 106-2, in the absence of external forces, to remain at rest at any angular position, relative to the proximal portion 108, about the spin axis 130.

In the assembled configuration, frame 100 further includes a spin joint 204, embedded within the second temple arm 106-2. The spin joint allows the second portion 110 of the second temple arm 106-2 to rotate without interruption, relative to the first portion 108 of the second temple arm 106-2, about the spin axis 130. In some implementations, the spin joint 204 includes a frictional interface (e.g., between ball portion 210 and socket portion 206) that causes the second portion 110 of the second temple arm 106-2, in the absence of external forces, to remain at rest at any angular position, relative to the proximal portion 108, about the spin axis 130.

Figure 4:
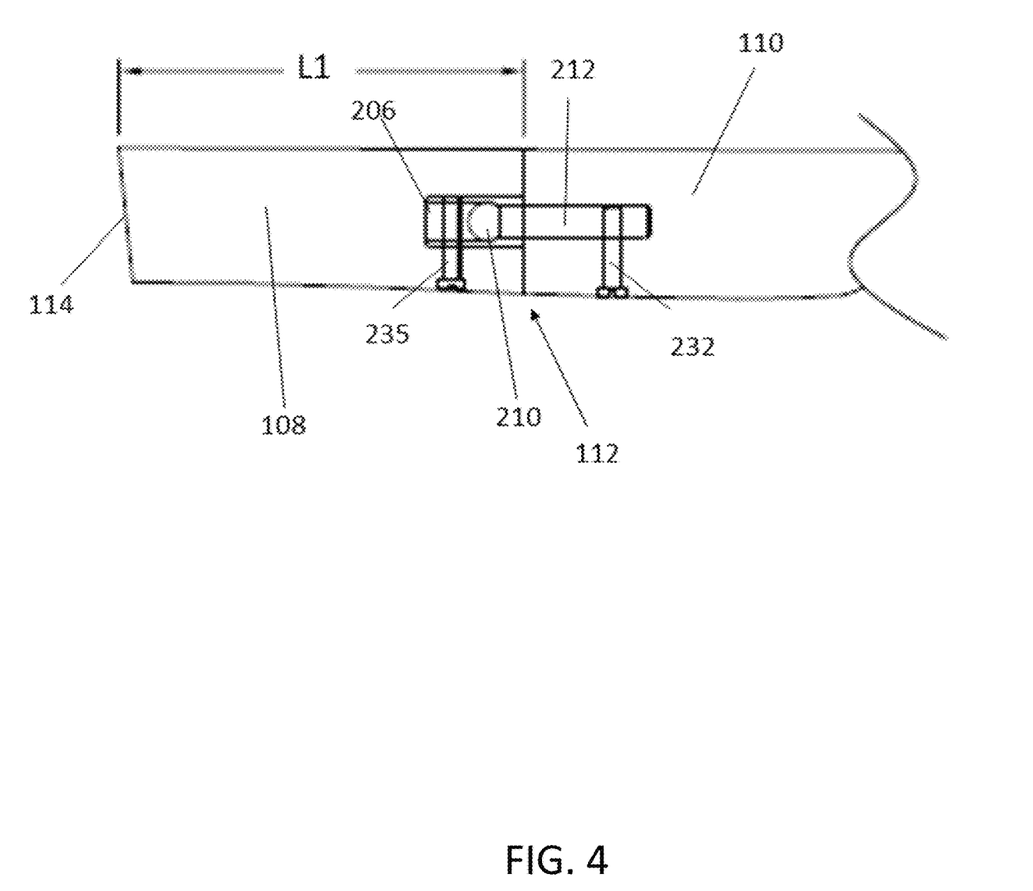
FIG. 4 illustrates a side view of a portion of a temple arm of a spinnable frame for spectacles, according to various aspects of the disclosure.

FIG. 4 illustrates a side view of a portion of temple arm 106-2 in the vicinity of spin interface 112, in an assembled configuration. In the example of FIG. 4, for illustrative purposes, first and second portions 108 and 110 of temple arm 106-2 are shown in partial transparency so that the assembled spin joint can be seen.

In this example, ball portion 210 engages with socket portion 206 within first portion 108 of temple arm 106-2. Socket portion 206 is fixed within first portion 108 by pin/screw 235 extending from the bottom surface of first portion 108 into socket portion 206 of spin joint 204. Shaft 212 can also be seen extending across interface 112 between first and second portions 110, with pin/screw 232 extending into shaft 212 to secure shaft 212 within second portion 110. It can be seen in FIG. 4 that shaft 212 defines the spin axis (130) about which second portion 110 can rotate, relative to first portion 108. As indicated in FIG. 4, spin interface 112 may be located at a distance, L1, from the proximal end 114 of proximal portion 108.

Some frames can include hinges between a front portion and temple arm of a frame that include features that allow partial, spring-controlled rotation of the temple arm, typically to allow a 180 degree flip of the temple arm for compact storage, or to allow small angle (i.e., less than 10 degrees and controlled by stop feature) adjustments for comfort. In contrast, spinnable frame 100 of FIGS. 1 and 2 allows free rotation of second portion 110 through any number of degrees in a forward or reverse direction. Moreover, hinge mechanisms for a 180 degree flip or small-angle stopped adjustment are commonly integrated with the hinge for folding the temple arm for storage. In further contrast, the spin joint 204 of spinnable frame 100 is separated from the hinge interface 115 and proximal end 114 of temple arm 106-2 by a length of the temple arm. In this way, separate structures are provided that allow the convention folding of temple arms about hinge axes, and the spinnable features of the present disclosure.

Figure 5:
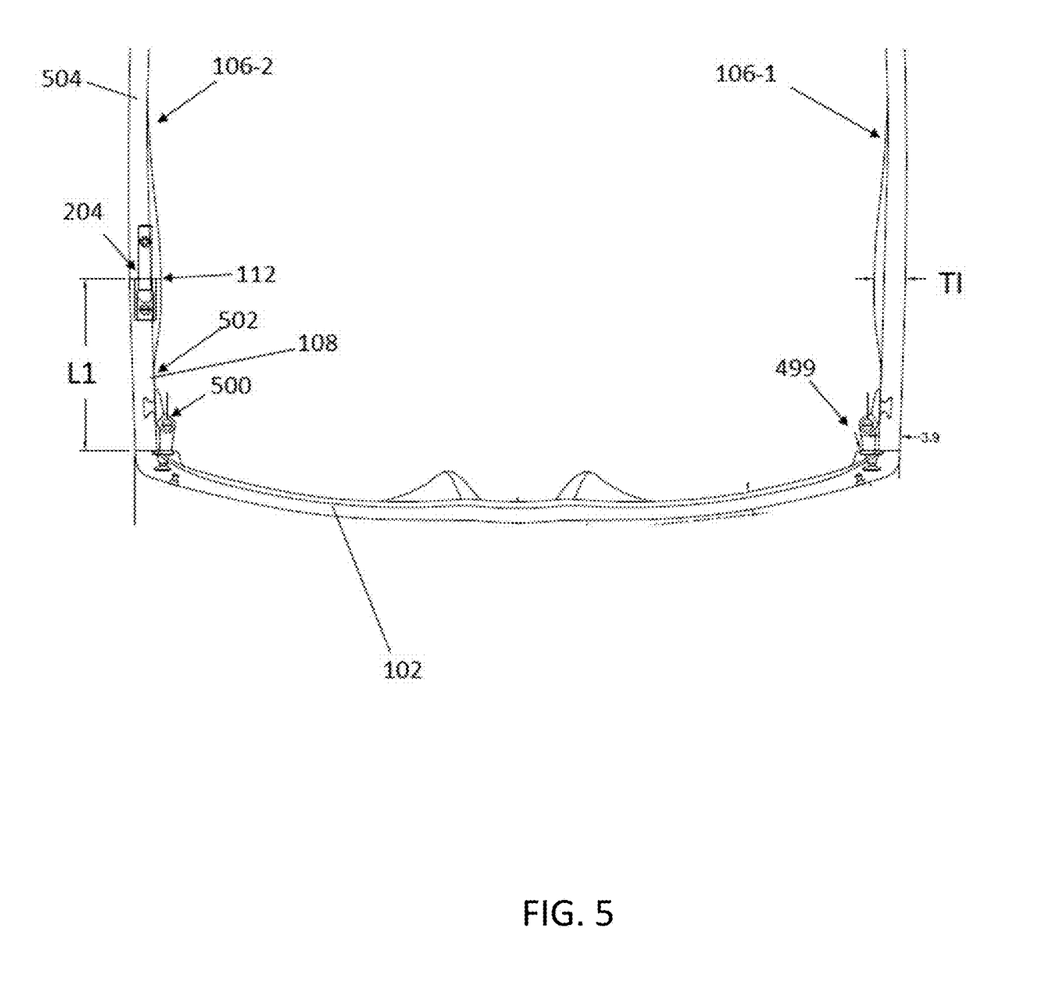
FIG. 5 illustrates a top view of a portion of a spinnable frame for spectacles, according to various aspects of the disclosure.

FIG. 5 illustrates a top view of frame 100 in which a length 502 of proximal portion 108 can be seen extending between hinge 500 (e.g., comprising the assembled second hinge at second end 222 formed by male part 224-2 on front portion 102, female part 226-2 on temple arm 106-2, bolt 228-2, and nut 230-2, as described above in connection with FIG. 2) and spin interface 112. In the example of FIG. 5, for illustrative purposes, frame 100, including first temple arm 106-1, and first and second portions 108 and 110 of temple arm 106-2, are shown in partial transparency so that the assembled spin joint 204 can be seen in second temple arm 106-2, and first temple arm 106-1 (coupled to front portion 102 by first hinge 499) can be seen to be a monolithic, pivotable, but non-rotatable temple arm.

The top view of FIG. 5 also illustrates how each of temple arms 106-1 and 106-2 may have an increased thickness at a location corresponding to the location of spin interface 112 of temple arm 106-2. In second temple arm 106-2, the increased thickness at spin interface 112 is provided to accommodate the structures of spin joint 204 embedded therein, as shown in FIG. 5. In the first temple arm 106-1, although no spin joint is provided in this example, the thickness is increased at a corresponding length L1 from the proximal end of that temple arm, to a thickness, TI (e.g., a thickness that corresponds to the thickness of second temple arm 106-2 at the same distance, L1, from front portion 102). In this way, frame 100 is provided with a symmetric look and a balanced construction, even in configurations in which only one temple arm is spinnable.

As shown in the top view of FIG. 5, first and second temple arms 106-1 and 106-2 may each smoothly and symmetrically (to each other) increase in thickness with increasing distance from front portion 102 to a length L1 therefrom, and then smoothly and symmetrically decrease in thickness with increasing distal distance beyond the length L1. In this way, temple arm 106-2 may be provided with a first portion 108 that has a first thickness at a first position (e.g., at length 502) near the second hinge 500, and a second thickness (e.g., thickness, TI, at interface 112), larger than the first thickness, near the interface 112 between the first portion 108 and the second portion 110. In this example, second portion 110 has a first thickness at a first location 504 near the second temple tip 122 and a second thickness (e.g., thickness, TI, at interface 112), larger than the first thickness, near the interface 112 between the first portion 108 and the second portion 110.

Figure 6:
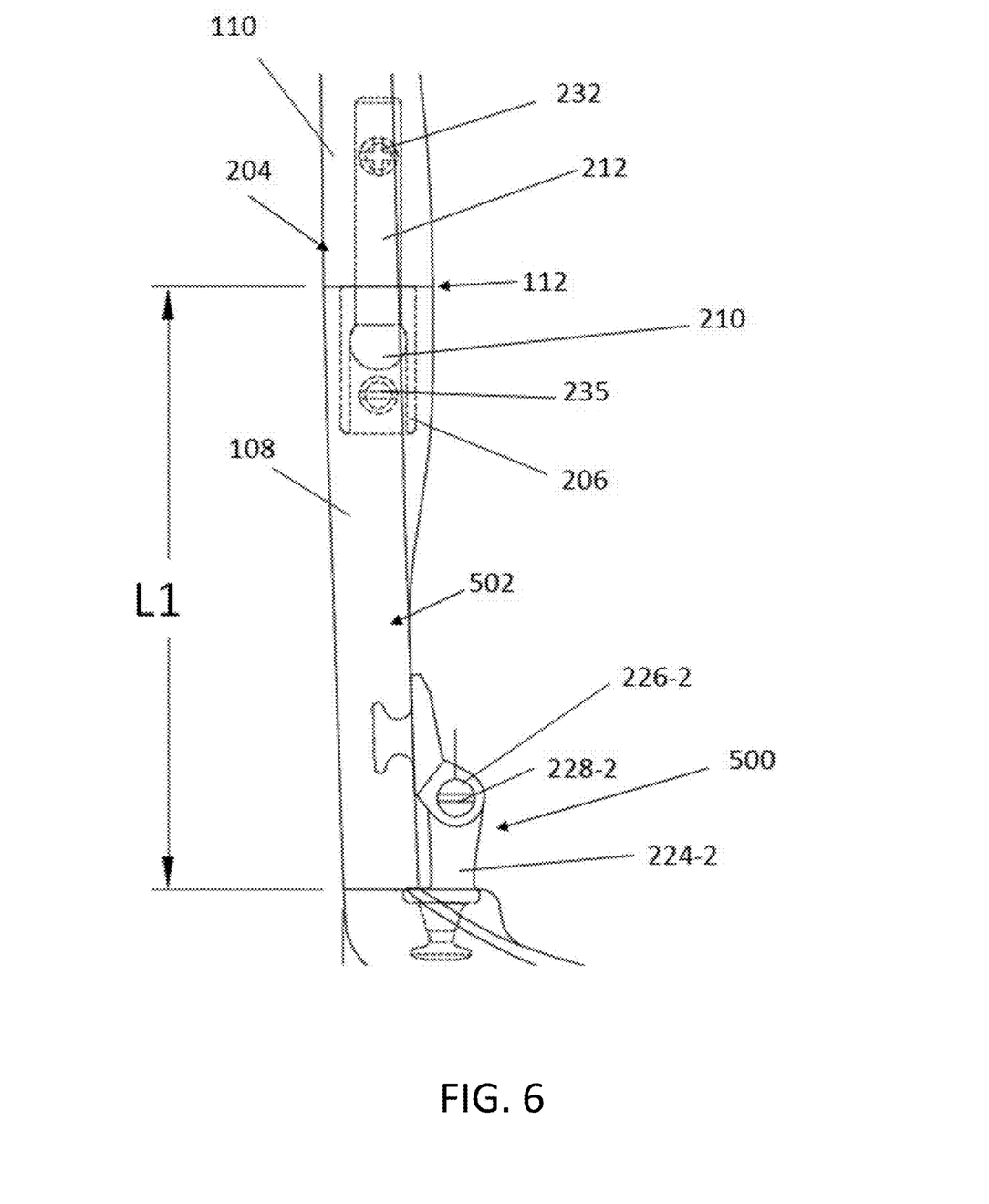
FIG. 6 illustrates an enlarged section of the top view of the portion of the spinnable frame for spectacles of FIG. 5, according to various aspects of the disclosure.

FIG. 6 shows an enlarged top view of the portion of temple arm 106-2 housing spin joint 204. In the example of FIG. 6, the assembled configuration of second hinge 500 can be seen in which bolt 228-2 passes through openings in the male and female parts 224-2 and 226-2, and nut 230-2 attaches to bolt 228-2 to hold male part 224-2 within and aligned with female part 226-2, so that proximal portion 108 of temple arm 106-2 can pivot about a second hinge axis 132, defined by the shaft of bolt 228-2, without rotating relative to front portion 102 of frame 100. The length 502 of first portion 108, separating hinge 500 and spin interface 112, can also be seen. The increasing thickness of temple arm 106-2 with increasing distal distance from length 502 to interface 112 can also be seen.

Figure 7:
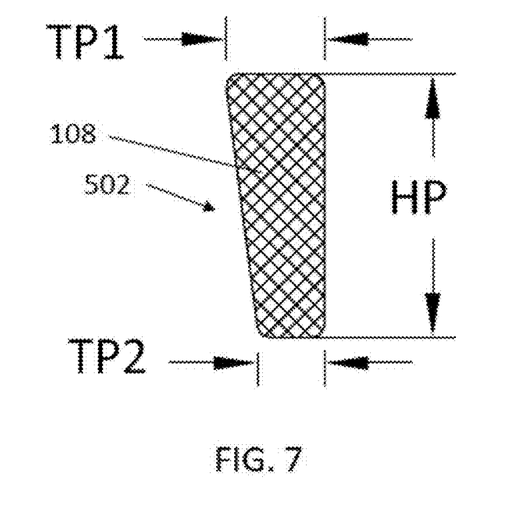
FIG. 7 illustrates a cross-sectional view of a proximal portion of a temple arm of a spinnable frame for spectacles, according to various aspects of the disclosure.
Figure 8:
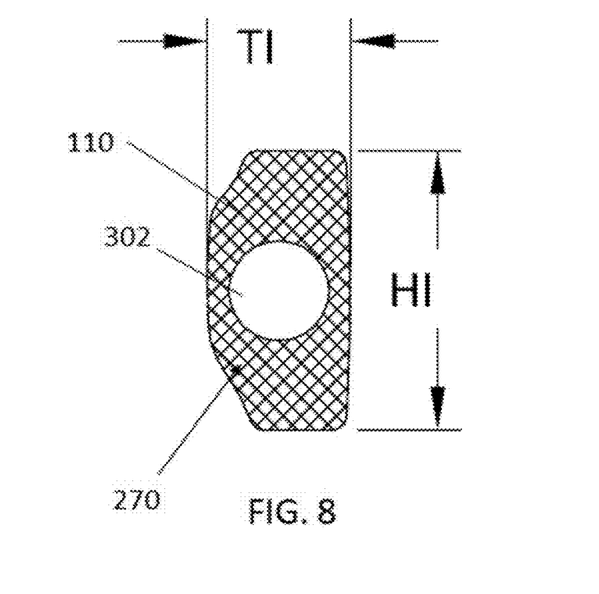
FIG. 8 illustrates a cross-sectional view of a distal portion of a temple arm of a spinnable frame for spectacles near an interface of the temple arm, according to various aspects of the disclosure.
Figure 9:
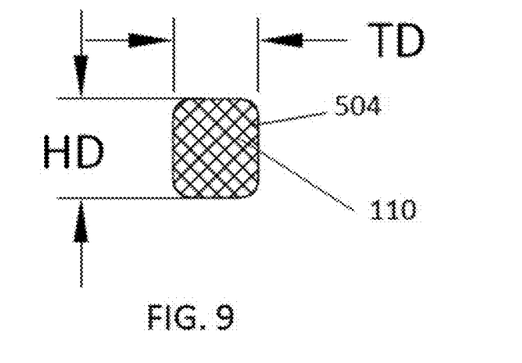
FIG. 9 illustrates a cross-sectional view of a distal portion of a temple arm of a spinnable frame for spectacles near a temple tip of the temple arm, according to various aspects of the disclosure.

FIGS. 7, 8, and 9 are cross-sectional views of temple arm 106-2 at various locations along the temple arm, that illustrate the varying thickness that is provided for accommodating spin joint 204 within the rotatable temple arm 106-2.

For example, FIG. 7 illustrates a cross-sectional end view of proximal portion 108 at length 502. In this example, proximal portion 108 has a thickness at this location that decreases, moving vertically, from a thickness TP1 to a thickness TP2, each of which is smaller than the thickness, TI, at interface 112. The overall thickness of proximal portion 108 at the location illustrated in FIG. 7 can be the mean or median of thicknesses TP1 and TP2. Moreover, it should be appreciated that the vertically changing thickness of proximal portion 108 at this location is merely illustrative, and this portion of proximal portion 108 can have a vertically constant thickness, or can have a thickness that changes in other vertical arrangements as desired. In various implementations, thickness TP1 may be between 2 millimeters (mm) and 4 mm, and thickness TP2 may be between 3 mm and 5 mm (as examples).

As shown in FIG. 8, in which surface 270 of distal portion 110 at interface 112 can be seen, distal portion 110 may have a maximum thickness TI at interface 112. As shown, the thickness TI allows opening 302 (for shaft 212) to be surrounded on all sides by the material of temple arm 106-2. In various implementations, thickness TI may be between 5 mm and 7 mm. The interfacing surface 271 of proximal portion 108 (not shown in FIG. 8) may have a maximum thickness, TI, and a shape that matches the maximum thickness and shape of surface 271 of distal portion 110 so that, when these surfaces are rotationally aligned about the spin axis, the outer surface of temple arm 106-2 is substantially smooth at interface 112 (except for the physical break between the proximal and distal portions).

FIG. 8 illustrates a cross-sectional end view of distal portion 110 at location 504 of FIG. 5. In this example, distal portion 110 has a thickness, TD, at location 504, where thickness, TD, may be smaller than thickness, TI, at interface 112. For example, thickness, TD, may be between 2.5 mm and 4.5 mm in various implementations.

FIGS. 7, 8, and 9 also illustrate exemplary vertical heights HP, HI, and HD for temple arm 106-2 at length 502, interface 112, and location 504, respectively. For example, height HP may be smaller than height HI and larger than height HD. However, this is merely illustrative, and other relative heights can be used at these locations.

Figure 10:
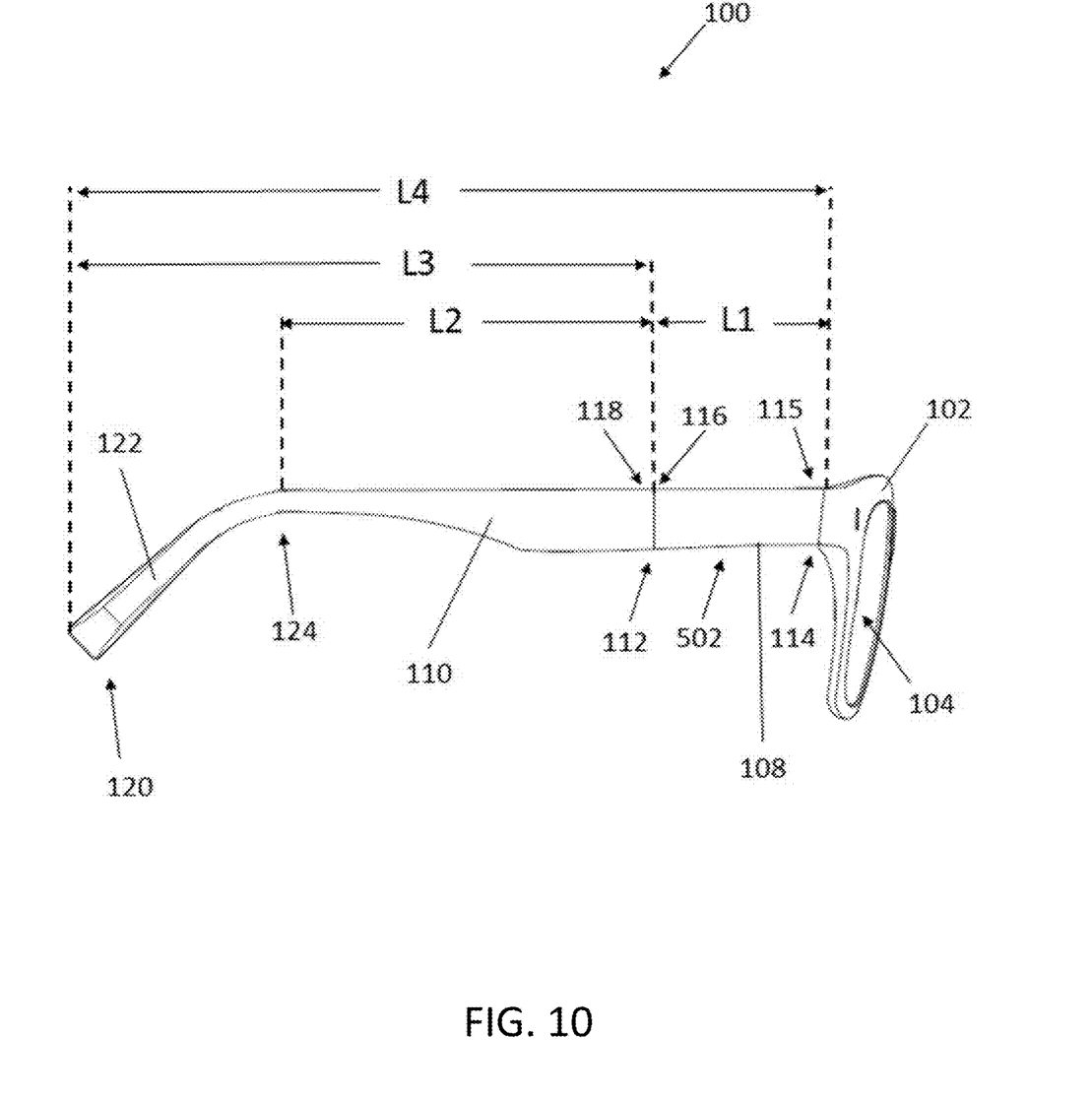
FIG. 10 illustrates additional features of the side view of the spinnable frame for spectacles of FIG. 1, according to various aspects of the disclosure.

FIG. 10 illustrates a side view of frame 100 in which further details of various lengths of temple arm 106-2 are indicated. In the example of FIG. 10, interface 112 is separated from hinge interface 115 (e.g., and the second hinge 500 disposed at that hinge interface as shown by FIGS. 2, 5, and 6) by a length 502 of the first portion of the second temple arm.

In this example, interface 112 is nearer the second hinge 500 and hinge interface 115 than the temple tip 122 of temple arm 106-2. The interface 112, in this example, is also nearer the second hinge 500 than a curve 124 between the interface 112 and the temple tip 122. For example, as illustrated, interface 112 may be located at a distance, L1, from hinge interface 115, a distance, L2, from curve 124, and a distance, L3, from the distal end 120 of distal portion 110. In this example, the overall linear-equivalent length (e.g., the linear distance from hinge interface 115 to the distal end 120) of temple arm 106-2 is indicated as L4. As illustrated, interface 112 is located at a distance, L1, from the proximal end 114 of the first portion 108 that is between twenty percent and twenty five percent of the total length, L4, of the second temple arm.

Distance, L1, may be between 25 and 35 mm (for example). Distance, L2, may be between 75 mm and 90 mm (for example). Distance, L3, may be between 108 mm and 128 mm (for example). Distance, L4, may be between 125 mm and 165 mm (for example).

Figure 11:
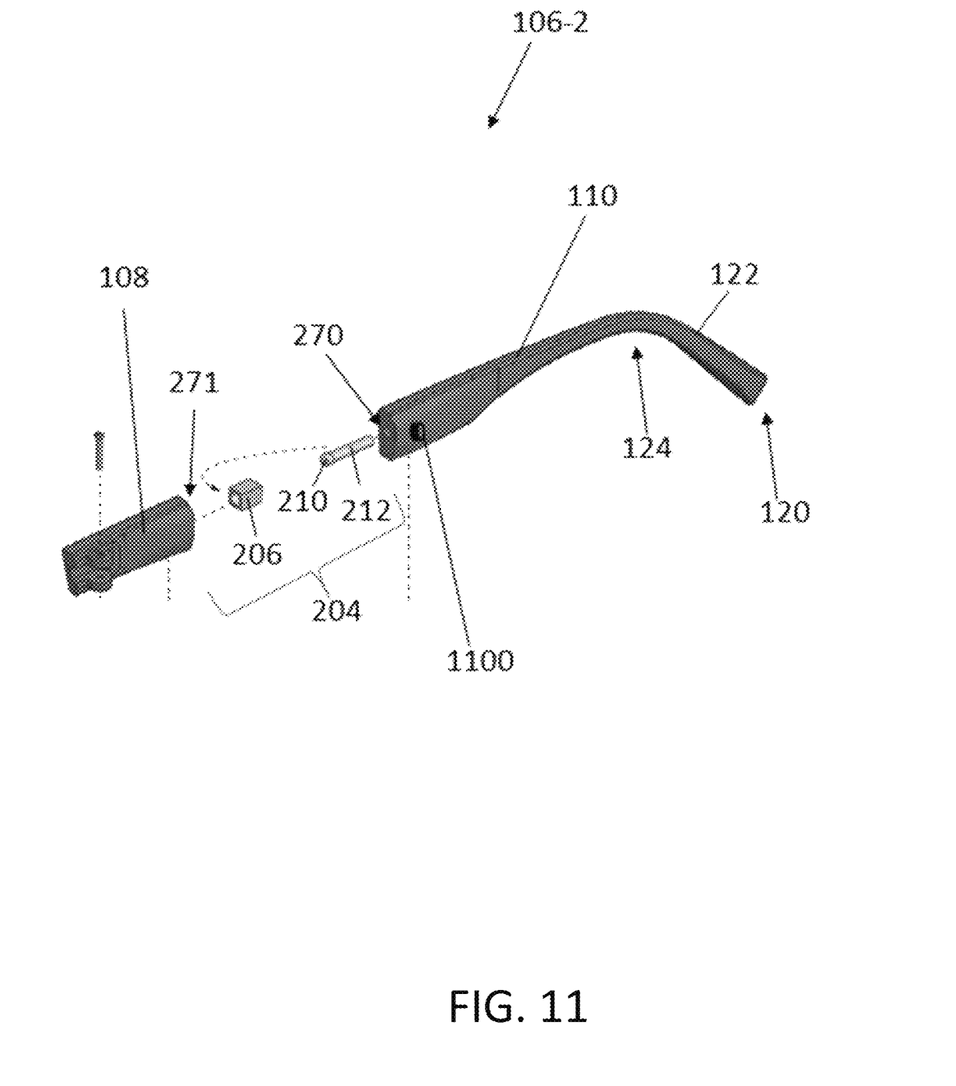
FIG. 11 illustrates an exploded to perspective view of a rotatable temple arm with a latch for a pair of spectacles, according to various aspects of the disclosure.

In the examples described above, distal portion 110 of temple arm 106-2 is always allowed to freely rotate to any angular position about spin axis 130. However, it should also be appreciated that, in some implementations, temple arm 106-2 can be provided with a latch that can be operated to control the rotation of temple arm 106-2 about the spin axis. For example, FIG. 11 illustrates an example in which temple arm 106-2 includes a latch 1100 thereon. In this example, latch 1100 operable to fix distal portion 110 of temple arm 106-2, relative to proximal portion 108, about the spin axis 130 (e.g., in a position in which the interfacing surfaces 270 and 271 are aligned (e.g., as in the configuration of FIG. 1).

For example, latch 1100 may be a compressible button or a slider switch having a first position in which distal portion 110 of temple arm 106-2 allowed to freely rotate to any angular position about spin axis 130 as described herein, and a second position in which a portion of the latch 1100 engages with shaft 212 to stop the rotation of distal portion 110 (e.g., in a preferred position such as a position suitable for wearing the frame 100).

For example, latch 1100 may be a compressible (e.g., spring-loaded) button that is coupled to a pin (not shown) that releases distal portion 110 for free rotation when the button is compressed and that engages proximal portion 108 (e.g., engages a corresponding feature configured to receive the pin across interface 112) to stop the distal portion 110. In this example, a user can depress the button while holding distal portion 110 to allow spinning of the remainder of frame 100 about the spin axis 130. The user can then release the button to latch distal portion 110 in the wearing position.

As another example, latch 1100 may be a switch that slides along the surface of distal portion 110 and is coupled to a pin (not shown) that releases distal portion 110 for free rotation when the switch is in a disengaged position, and that engages with proximal portion 108 (e.g., engages with a corresponding feature configured to receive the pin across interface 112) to stop the rotation of distal portion 110 when the switch is in an engaged position. In this example, the user can slide the switch to the disengaged position (e.g., toward distal end 120) to allow spinning of the remainder of frame 100 about the spin axis 130. The user can then slide the switch to the engaged position (e.g., toward proximal end 118) to latch distal portion in the wearing position. A switch implementation of latch 1100 can be a spring-loaded switch arranged so that the engaged or disengaged position is a preferred (resting) position for the switch, or the switch can be arranged to remain in either of the engaged or disengaged positions in the absence of external forces.

In the example of FIG. 11, latch 1100 is disposed on an interior surface of distal portion 110. However, it should be appreciated that latch 1100 can be disposed on the exterior surface, top surface, or bottom surface of distal portion 110, or on an interior, exterior surface, top surface, or bottom surface of proximal portion 108.

In the examples described above, frame 100 includes a first temple arm 106-1 that is a non-rotatable (e.g., monolithic) temple arm, and a second temple arm 106-2 that is a rotatable temple arm having a spin joint that allows free rotation of a distal portion thereof. However, it should also be appreciated that, in some implementations, first temple arm 106-1 can be provided with a spin joint that allows free rotation of a distal portion thereof.

Figure 12:
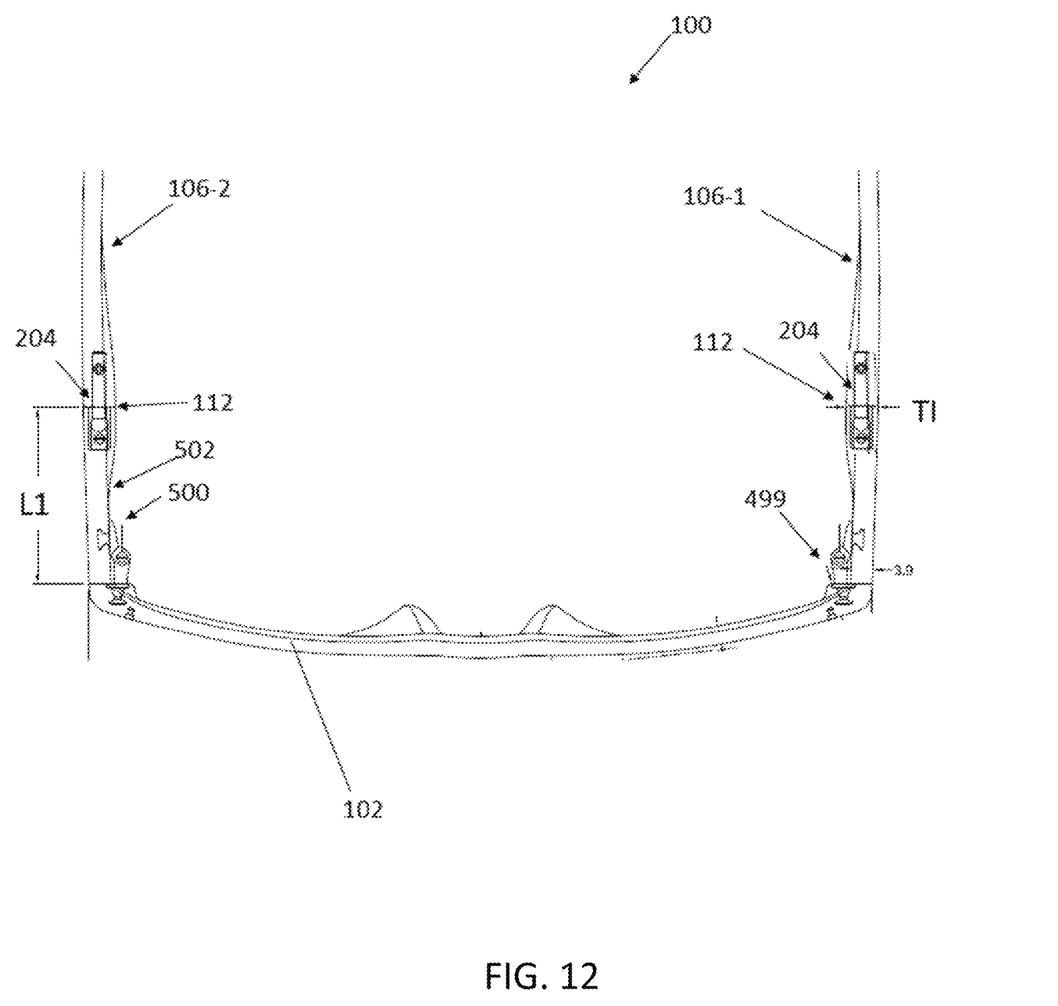
FIG. 12 illustrates a top view of a portion of a spinnable frame for spectacles having spin joints in both temple arms, according to various aspects of the disclosure.

For example, FIG. 12 illustrates an example in which both temple arm 106-1 and temple arm 106-2 are provided with a spin joint 204 at a spin interface 112. In yet another example, temple arm 106-1 can be provided with a spin joint 204 at a spin interface 112, and temple arm 106-2 can be a non-rotatable (e.g., monolithic) temple arm. In these examples, temple arm 106-1 includes a distal portion that is rotatable, about an additional spin axis, relative to a proximal portion of that temple arm.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Other variations are within the scope of the following claims.

What is claimed is:

1. A frame for spectacles, the frame comprising:
   a front portion having two symmetric openings, a first opening in which a first lens is disposed and a second opening in which a second lens is disposed;
   a first temple arm having a proximal end that is coupled to a first end of the front portion by a first hinge, and having a distal end comprising a first temple tip; and
   a second temple arm, wherein the second temple arm includes:
      a first portion that extends between a proximal end that is coupled to an opposing second end of the front portion by a second hinge, and a distal end,
      a second portion that extends between a proximal end that is coupled to the distal end of the first portion, and a distal end comprising a second temple tip,
      wherein the second portion of the second temple arm is freely rotatable, relative to the first portion of the second temple arm, about a spin axis that is substantially parallel to a length of the second temple arm at an interface between the distal end of the first portion and the proximal end of the second portion, and
      a ball and socket joint that spans the interface between the distal end of the first portion and the proximal end of the second portion, the ball and socket joint prevent the second portion from moving away from the first portion, a first pin securing a first end of the ball and socket joint within the first portion, and a second pin securing a second end of the ball and socket joint.

2. The frame of claim 1, wherein the first temple arm is a monolithic temple arm that extends continuously from the first hinge to the first temple tip.

3. The frame of claim 1, wherein the spin axis is substantially perpendicular to a hinge axis of the second hinge at any pivot position of the second temple arm about the second hinge.

4. The frame of claim 1, wherein the first portion of the second temple arm is pivotable about the second hinge, and fixed with respect to the spin axis.

5. The frame of claim 1, wherein the first portion has:
   a first thickness at a first position near the second hinge, and
   a second thickness, larger than the first thickness, near the interface between the first portion and the second portion.

6. The frame of claim 5, wherein the second portion has a first thickness at a first position near the second temple tip and a second thickness, larger than the first thickness, near the interface between the first portion and the second portion.

7. The frame of claim 1, wherein the interface is separated from the second hinge by a length of the first portion of the second temple arm.

8. The frame of claim 7, wherein the interface is nearer the second hinge than the second temple tip.

9. The frame of claim 8, wherein the interface is nearer the second hinge than a curve between the interface and the second temple tip.

10. The frame of claim 9, wherein the interface is located at a distance from the proximal end of the first portion that is between twenty percent and twenty five percent of a total length of the second temple arm.

11. A pair of spectacles, comprising:
   first and second lenses; and
   a frame, comprising:
      a front portion having a first opening in which the first lens is disposed and a second opening in which the second lens is disposed;
      a first temple arm having a proximal end that is coupled to a first end of the front portion by a first hinge, and having a distal end comprising a first temple tip; and
      a second temple arm, wherein the second temple arm includes:
         a first portion that extends between a proximal end that is coupled to an opposing second end of the front portion by a second hinge, and a distal end,
         a second portion that extends between a proximal end that is coupled to the distal end of the first portion, and a distal end comprising a second temple tip,
         wherein the second portion of the second temple arm is freely rotatable, relative to the first portion of the second temple arm, about a spin axis that is substantially parallel to a length of the second temple arm at an interface between the distal end of the first portion and the proximal end of the second portion, and a ball and socket joint that spans the interface between the distal end of the first portion and the proximal end of the second portion, the ball and socket joint preventing the second portion from moving away from the first portion, a first pin securing a first end of the ball and socket joint within the first portion, and a second pin securing a second end of the ball and socket joint.

12. The pair of spectacles of claim 11, wherein the second portion of the second temple arm is freely rotatable, relative to the first portion of the second temple arm, about the spin axis in a first angular direction, and freely rotatable, relative to the first portion of the second temple arm, about the spin axis in a second angular direction that is opposite to the first angular direction.

13. The pair of spectacles of claim 12, wherein the second portion of the second temple arm is freely rotatable, relative to the first portion of the second temple arm, about the spin axis for more than three hundred sixty degrees in the first angular direction and the second angular direction.

14. The pair of spectacles of claim 11, wherein the second portion of the second temple arm is configured, in an absence of external forces, to remain at rest at any angular position, relative to the first portion, about the spin axis.

15. The pair of spectacles of claim 14, wherein the interface comprises a frictional interface that causes the second portion of the second temple arm, in the absence of external forces, to remain at rest at any angular position, relative to the first portion, about the spin axis.

16. The pair of spectacles of claim 14, further comprising a spin joint, embedded within the second temple arm, wherein the spin joint:

allows the second portion of the second temple arm to rotate without interruption, relative to the first portion of the second temple arm, about the spin axis, and includes a frictional interface that causes the second portion of the second temple arm, in the absence of external forces, to remain at rest at any angular position, relative to the first portion, about the spin axis.

17. The pair of spectacles of claim 11, further comprising a latch on the second temple arm, the latch operable to fix the second portion of the second temple arm, relative to the first portion, about the spin axis.

18. The pair of spectacles of claim 11, wherein the first temple arm comprises a distal portion that is rotatable, about an additional spin axis, relative to a proximal portion of the first temple arm.

19. A frame for spectacles, the frame comprising:

a front portion including a first opening in which a first lens is disposed and a second opening in which a second lens is disposed;

a pair of temple arms, each coupled to a respective end of the front portion and pivotable relative to the front portion about a respective hinge access, wherein at least one of the temple arms includes a spin joint that allows a distal portion of that temple arm to rotate freely, relative to a proximal portion of that temple arm, the front portion, and the other of the temple arms; and a ball portion and a socket portion that spans an interface between the pair of temple arms, the ball portion and the socket portion preventing a first temple arm of the pair of temple arms from moving away from a second temple arm of the pair of temple arms, a first pin securing the socket portion within the distal portion of the at least one temple arm, and a second pin securing the ball portion within the proximal portion of the at least one temple arm.

20. The frame of claim 19, wherein the spin joint allows the distal portion of the at least one of the temple arms to rotate freely, relative to the proximal portion, about a spin axis that is substantially parallel to a length of the at least one of the temple arms at an interface between the proximal portion and the distal portion of that temple arm.

21. The frame of claim 20, wherein the spin joint comprises a ball and socket joint embedded within the at least one of the temple arms and spanning the interface.

22. The frame of claim 21, wherein the ball and socket joint comprises:

the socket portion embedded within the proximal portion; and the ball portion, positioned within the socket portion, and attached to a shaft that is fixed to the distal portion and extends across the interface between the proximal portion and the distal portion.

23. The frame of claim 22, wherein the ball portion rotates, about the spin axis, with respect to the socket portion, and to engage with the socket portion to prevent the distal portion of the at least one of the temple arms from moving away from the proximal portion along the spin axis.

24. The frame of claim 23, wherein opposing surfaces of the proximal and distal portions of the at least one of the temple arms prevent the distal portion of the at least one of the temple arms from rotating relative to the proximal portion, other than about the spin axis.

* * * * *